United States Patent [19]

Kihara et al.

[11] 4,071,856

[45] Jan. 31, 1978

[54] SERVO-CONTROL SYSTEM FOR SIGNAL RECORDING AND/OR REPRODUCING APPARATUS

[75] Inventors: Nobutoshi Kihara; Minoru Morio, both of Tokyo, Japan

[73] Assignee: Sony Corporation, Tokyo, Japan

[21] Appl. No.: 689,829

[22] Filed: May 25, 1976

[30] Foreign Application Priority Data

May 26, 1975 Japan .................................. 50-62663

[51] Int. Cl.² ............................................. G11B 15/46
[52] U.S. Cl. ...................................... 360/73; 360/77; 360/70; 360/66; 360/64
[58] Field of Search .................... 360/77, 70, 73, 75, 360/33, 60, 64, 66, 122, 119, 84, 85

[56] References Cited

U.S. PATENT DOCUMENTS

| 3,293,627 | 12/1966 | Auyang | 360/77 |
|---|---|---|---|
| 3,504,116 | 3/1970 | Sato | 360/66 |
| 3,838,453 | 9/1974 | Buslik | 360/70 |
| 3,911,477 | 10/1975 | Lackner | 360/66 |
| 4,005,481 | 1/1977 | Lackner | 360/66 |

Primary Examiner—Vincent P. Canney
Assistant Examiner—Alan Faber
Attorney, Agent, or Firm—Lewis H. Eslinger; Alvin Sinderbrand

[57] ABSTRACT

In an apparatus for recording and/or reproducing information signals, such as, video signals, on a magnetic tape or other record medium by means of rotary recording and/or reproducing heads which scan successive parallel tracks extending across the tape as the latter is longitudinally advanced: a servo-control system for ensuring accurate scanning of the tracks during reproducing operation includes an auxiliary rotary head repeatedly traversing the tape in coordination with the recording and/or reproducing heads and which, during the recording operation, records pilot signals in areas that are spaced apart along an edge portion of the tape and also traversed by the recording and/or reproducing heads, with each of such areas having an extent in the longitudinal direction of the tape that corresponds, and is in predetermined positional relation to a respective plurality of the successive tracks in which the information signals are being recorded; and, during reproducing operation of the apparatus, a reproduced pilot signal is derived from each of the recording and/or reproducing heads during each traversal by the latter of each area in which a pilot signal is recorded, the levels of the reproduced pilot signals obtained during two different traversals of each area recorded with the pilot signal are compared, and, on the basis of such level comparison, the speed of advancement of the tape is regulated.

16 Claims, 13 Drawing Figures

SERVO-CONTROL SYSTEM FOR SIGNAL RECORDING AND/OR REPRODUCING APPARATUS

BACKGROUND OF THE INVENTION

1. Field of the Invention

This invention relates generally to an apparatus for recording and/or reproducing information signals, such as, video signals, in successive parallel tracks on a magnetic tape or other record medium by means of transducers or heads which scan such tracks as the record medium is advanced, and is more particularly directed to an improved servo-control system for ensuring accurate scanning of the successive tracks by the heads of transducers during reproducing operation of the apparatus.

2. Description of the Prior Art

In existing apparatus, such as, a so-called VTR, for recording and/or reproducing video signals on a magnetic tape by means of rotary recording and/or reproducing heads which scan successive parallel tracks extending across the tape as the latter is longitudinally advanced, a predetermined interval of the video signals, such as, a field or frame interval, is applied to each rotary head during the scanning by the latter of a track extending across the tape so that such field or feame interval of the video signals will be recorded in the respective tracks. Further, during such recording operation of the apparatus, a control signal or pulse indicative of the rotational position of the rotary heads and/or the commencement of each field or frame interval of the video signals being recorded is applied to a fixed transducer or head for recording on a longitudinal edge portion of the tape as the latter is advanced past the fixed head. During reproducing operation of the apparatus, a fixed head reproduces the control signals recorded at spaced apart locations along the longitudinal edge portion of the tape as the latter is advanced past such fixed head, and such reproduced control signals are compared with pulse signals indicative of the rotational position of the rotary recording and/or reproducing heads in a servo-control system for regulating the advancement of the tape relative to the repeated traversing thereof by the rotary heads for ensuring that the latter will accurately scan the successive parallel tracks in which the video signals are recorded.

The foregoing servo-control system has been generally satisfactory so long as the tape is advanced at a substantial speed during recording and reproducing operations. However, it has recently been proposed to provide a video signal recording and/or reproducing apparatus, as aforesaid, in which the speed of advancement or transport of the tape is extremely low so as to substantially reduce the jitter components contained in the reproduced video signals. With such a very low speed of advancement of the tape, the fixed head is incapable of providing a sufficiently high level of reproduction of the control signals recorded along an edge portion of the tape and, accordingly, the existing servo-control system is unable to maintain accurate scanning or tracking of the successive parallel record tracks by the rotary heads during reproducing operation.

OBJECTS AND SUMMARY OF THE INVENTION

Accordingly, it is an object of this invention to provide an apparatus of the above described type with a servo-control system which is effective to maintain accurate tracking or scanning of the successive parallel record tracks during the reproducing operation even when the magnetic tape or other record medium is advanced at a very low speed.

In accordance with an aspect of this invention, an apparatus for recording and/or reproducing information signals, such as video signals, on a magnetic tape or other record medium by means of rotary recording and/or reproducing heads which scan successive parallel tracks extending across the tape as the latter is longitudinally advanced is provided with a servo-control system for ensuring accurate scanning of the tracks during reproducing operation and which comprises an auxiliary rotary head repeatedly traversing the tape or record medium in coordination with the recording and/or reproducing heads and which, during the recording operation, records pilot signals in areas that are spaced apart along an edge portion of the tape and also traversed by the recording and/or reproducing heads, with each of such areas having an extent in the longitudinal direction of the tape that corresponds, and is in predetermined positional relation to a respective plurality of the successive parallel tracks in which the information signals are being recorded. During reproducing operation of the apparatus, a reproduced pilot signal is derived from each of the recording and/or reproducing heads during each traversal by the latter of each area in which a pilot signal is recorded, and the reproduced pilot signals obtained during two different traversals of each area recorded with the pilot signal are compared, preferably as to their levels, to provide a resulting control signal by which the advancement of the tape or other record medium relative to the repeated traversing thereof by the rotary recording and/or reproducing heads is regulated.

In apparatus according to this invention, the auxiliary rotary head for recording the pilot signals, as aforesaid, may also function as an erasing head, or such auxiliary rotary head may be in addition to the usual erasing head.

The above, and other objects, features and advantages of the invention, will be apparent in the following detailed description of illustrative embodiments which is to be read in connection with the accompanying drawings

DESCRIPTION OF THE PREFERRED EMBODIMENTS

Figure 1:
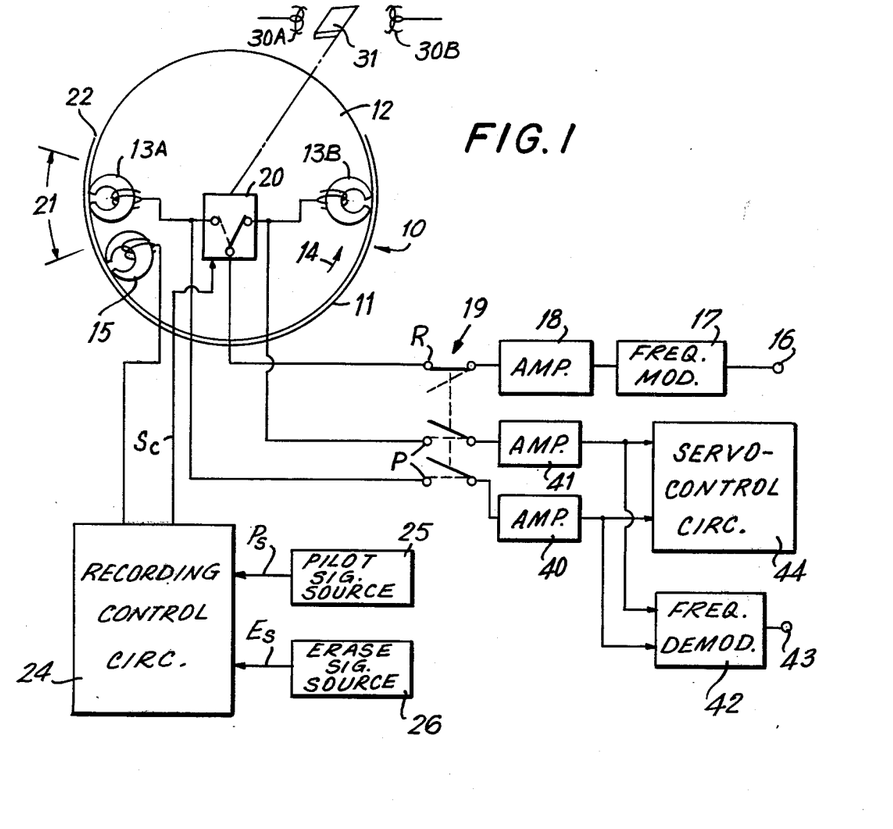
FIG. 1 is a schematic view of a recording and/or reproducing apparatus with a servo-control system according to this invention.

Referring to the drawings in detail, and initially to FIG. 1 thereof, it will be seen that a servo-control system according to an embodiment of this invention is there shown applied to an apparatus 10 for recording and reproducing video or other information signals on a record medium 11. The record medium 11 which may be in the form of a magnetic tape is longitudinally advanced during recording and reproducing operations, as by a conventional drive capstan (not shown) which is rotated at a controlled speed by an electric motor, as hereinafter described in detail. While being thus advanced, the magnetic tape 11 is suitably guided so as to be transversely curved and thereby wrapped about a portion of the periphery of a tape guide drum 12 which is suitably rotated, as by an electric motor (not shown). Two substantially diametrically opposed recording and reproducing heads 13A and 13B are associated with tape guide drum 12 so as to rotate with the latter, for example, in the direction of the arrow 14, and thereby repeatedly traverse magnetic tape 11 at a substantial angle to the direction of the longitudinal advancement of the tape for scanning successive parallel tracks which, for example, extend substantially at right angles to the direction of advancement. The apparatus 10 is further shown to have an auxiliary recording head 15 which is also associated with tape guide drum 12 for rotation with the latter in the direction of the arrow 14 in advance of the recording and reproducing head 13A.

In recording NTSC video signals with the apparatus 10, tape guide drum 12 and the associated heads 13A, 13B and 15 are rotated at the speed of 30 r.p.s. so that each of the heads 13A and 13B can record one field of the video signals in a respective track extending transversely across magnetic tape 11 during movement of the respective head 13A or 13B through an angular extent of 180°. Further, as shown on FIG. 1, the magnetic tape 11 extends transversely about more than 180°, that is, one-half, of the periphery of drum 12 so that each of heads 13A and 13B can record a field of video signals in a respective track which extends across less than the full width of the magnetic tape.

As shown schematically, the video signals to be recorded are received at an input terminal 16 and frequency modulated in a modulator 17 prior to being supplied through a recording amplifier 18 to a mode selecting switch 19. When mode selecting switch 19 is disposed to engage its record contact R for selecting recording operation of apparatus 10, the frequency modulated video signals are passed to a switching means 20 by which the video signals to be recorded are alternately applied to the rotary heads 13A and 13B in accordance with the rotational positions of such heads, as hereinafter described in detail. Preferably, switching means 20 is arranged to apply the video signals to be recorded to each of the heads 13A and 13B only after such head has moved the distance 21 past the longitudinal or side edge 22 of magnetic tape 11. Thus, as head 13A and 13B traverse the advancing magnetic tape 11 in a cyclically repeating order, the successive parallel tracks $T_{A1}$, $T_{B1}$, $T_{A2}$, $T_{B2}$ . . . etc. in which fields of the video signals are respectively recorded by heads 13A and 13B are spaced, at one end, by the distance 21 from the adjacent longitudinal edge or margin 22 of the magnetic tape (FIG. 2).

Figure 2:
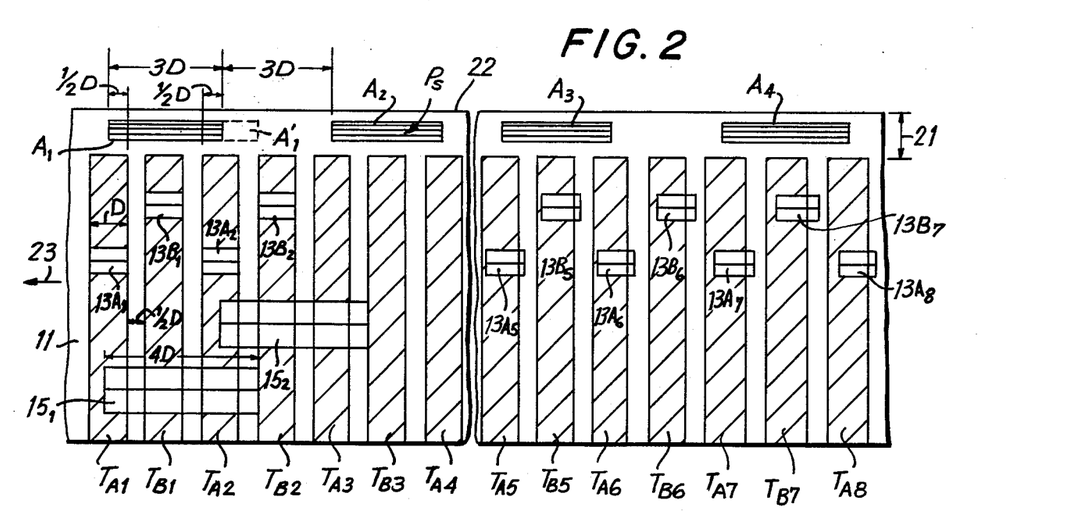
FIG. 2 is a fragmentary plan view showing a portion of a record medium on which successive parallel tracks recorded with information signals and areas in which pilot signals are recorded in accordance with this invention are schematically illustrated.

In accordance with the present invention, the auxiliary rotary head 15 which repeatedly traverses tape 11 in coordination with the rotary heads 13A and 13B is employed, during recording operation of apparatus 10, for recording pilot signals $P_s$ in areas $A_1$, $A_2$, $A_3$, . . . etc. that are spaced apart in the direction of advancement of the tape, indicated by the arrow 23 on FIG. 2, on the edge portion of tape 11 between longitudinal edge or margin 22 and the adjacent ends of the successive parallel tracks. Each of the areas $A_1$, $A_2$, . . . etc. is shown to have a length or extent in the direction 23 of advancement of tape 11 that corresponds, and is in a predetermined positional relation to a respective plurality of the successive parallel tracks in which the video signals are recorded by the heads 13A and 13B. More particularly, in the embodiment of the invention illustrated by FIGS. 1 and 2, the rotary heads 13A and 13B have gap widths D of, for example, 40 microns, for determining the widths of the successive parallel tracks in which the video signals are recorded, while the speed of advancement of tape 11 during recording operation is selected to provide guard bands having a width of one-half D, that is, 20 microns, between the adjacent record tracks. Further, each of the areas $A_1$, $A_2$ . . . etc., in which pilot signals are recorded has a length or extent in the direction of advancement of the tape equal to 3D and is longitudinally disposed in respect to the associated record tracks so that the opposite end portions of each area having the pilot signals recorded therein extend approximately half-way across the widths of the first and last tracks of the respective plurality of the successive parallel tracks. Thus, in the case of the area $A_1$ having the pilot signal recorded therein, the successive parallel tracks associated with that area are indicated at $T_{A1}$, $T_{B1}$ and $T_{A2}$, and the opposite end portions of the area $A_1$ extend approximtely half-way across the widths of the first and last tracks $T_{A1}$ and $T_{A2}$ of the plurality of successive parallel tracks associated with the area $A_1$. Furthermore, as shown on FIG. 2, the successive areas $A_1$, $A_2$, $A_3$ . . . etc. having pilot signals recorded therein are spaced from each other by distances 3D, that is, by distances equal to the lengths or extents of such areas in the direction 23 of advancement of the tape.

Furthermore, in the embodiment of the invention illustrated on FIGS. 1 and 2, the auxiliary rotary head 15 also functions, during the recording operation, as an erasing head. In other words, during the recording operation, a recording control circuit 24 functions to selectively apply to head 15 either the pilot signal $P_s$ from a suitable source 25 thereof or an erasing signal $E_s$ from a source 26 of the latter. More particularly, the recording control circuit 24 is operative to apply the pilot signal $P_s$ to auxiliary head 15 only during alternate revolutions of such head with drum 12 as head 15 traverses the edge portion of tape 11 adjacent longitudinal margin 22 thereof, and the circuit 24 is operative, at all other times, to apply the erasing signal $E_s$ to auxiliary head 15. Furthermore, as shown particularly on FIG. 2, auxiliary head 15 has a gap width in the direction 23 of advancement of the tape equal to 4D, and such head 15 is located in the direction of the axis of drum 12 relative to head 13A so that, as head 15 traverses tape 11 during one revolution of drum 12, as indicated at $15_1$ on FIG. 2, the area traversed by head 15 will overlap by one-half D the track $T_{A1}$ that is scanned by the head 13A during the same revolution of drum 12. Moreover, when the auxiliary head 15 has a gap width of 4D, as shown, the areas traversed by the auxiliary head in successive revolutions, as indicated at $15_1$ and $15_2$ on FIG. 2, will overlap by the distance D. Therefore, if the pilot signal $P_s$ is applied to auxiliary head 15 when moving across the edge portion of tape 11 in the position indicated at $15_1$ relative to the tape for recording the pilot signal in a respective area on the tape, during the next revolution of drum 12, the auxiliary head will be disposed as indicated at $15_2$ relative to the tape and, in moving across the edge portion of the tape, will erase the trailing end portion, as indicated in broken lines at $A_1'$, of the area in which the pilot signal was recorded during the previous revolution of drum 12.

Figure 3:
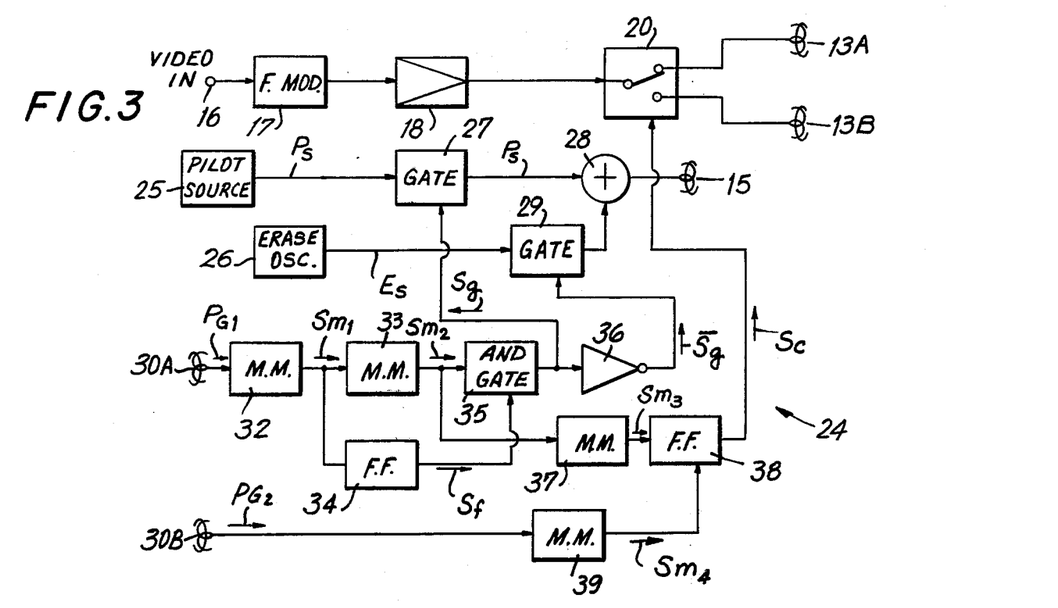
FIG. 3 is a schematic view of a recording circuit included in the apparatus of FIG. 1.

Referring now to FIG. 3, it will be seen that in a suitable arrangement of the circuit 24 for controlling the selective application of the pilot signal $P_s$ and the erase signal $E_s$ to the auxiliary rotary head 15 during recording operation of apparatus 10, the pilot signal $P_s$, which may have a frequency of 30–100 KHz, that is, substantially lower than the frequency band of the video or other information signals being recorded, is applied from the source 25 to the input of a gate 27. Thus, when the gate 27 is opened or gated, the pilot signal passes therethrough to one input of a mixing circuit 28 having its output connected to auxiliary rotary head 15. The erase signal $E_s$ from source 26, which may be in the form of a suitable oscillator, is similarly applied to the input of a gate 29 so that, when the latter is opened or gated, the erase signal is passed therethrough to another input of mixing circuit 28 for application to head 15.

Figure 4:
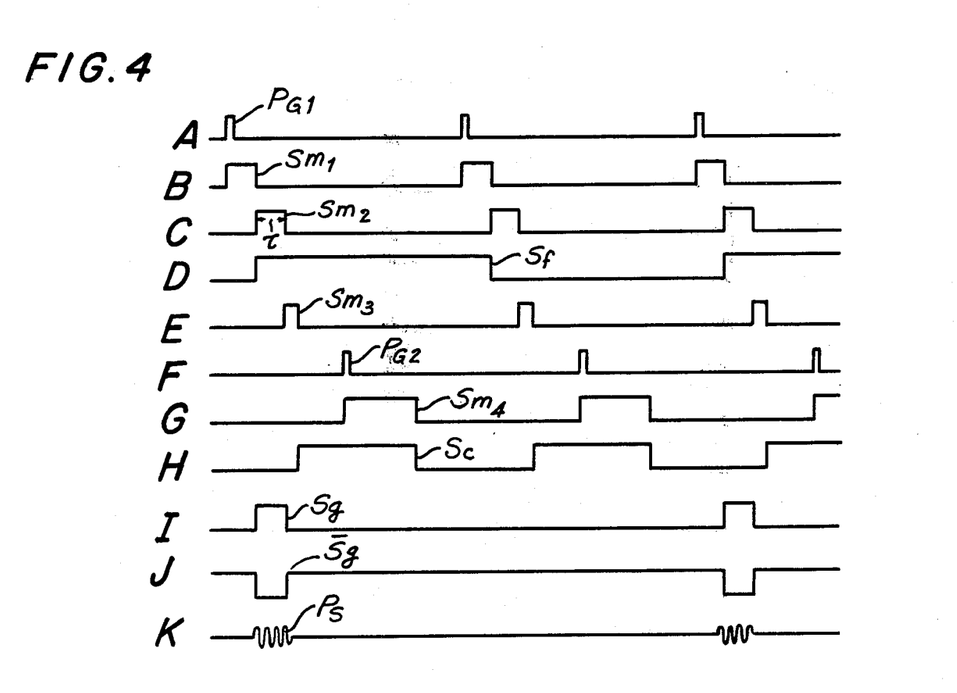
FIG. 4, consisting of 4A through 4K, is a series of waveform diagrams to which reference will be made in explaining the operation of the recording circuit of FIG. 3.

In order to correlate the opening of the gates 27 and 29 to the rotation of heads 13A, 13B and 15 with drum 12, apparatus 10 is shown to have diametrically opposed reference pulse generators or coils 30A and 30B (FIG. 1) associated with a magnet 31 rotating with drum 12 so that pulse generators 30A and 30B will emit reference pulse signals $P_{G1}$ and $P_{G2}$, respectively, shortly before the respective rotary heads 13A and 13B commence the scanning of tape 11 at the edge 22 of the latter. Returning to FIG. 3, it will be seen that each reference pulse signal $P_{G1}$ (FIG. 4A) from generator 30A triggers a monostable multivibrator 32 which produces an output $Sm_1$ (FIG. 4B), and that, at the termination or negative-going side of each output $Sm_1$, a monostable multivibrator 33 is triggered to produce an output $Sm_2$ (FIG. 4C) which corresponds, in time, to the traversal by auxiliary head 15 of the edge portion 21 of tape 11. The output $Sm_1$ from monostable multivibrator 32 is further applied to a flip-flop 34 so as to set and reset the latter in alternate revolutions of drum 12, whereby the output $S_f$ of flip-flop 34 has the values "1" and "0" in alternate revolutions of head 15 with drum 12 (FIG. 4D). The output $Sm_2$ from monostable multivibrator 33 and the output $S_f$ of flip-flop 34 are applied to respective inputs of an AND gate 35 so that only the output $Sm_2$ which occurs when the output $S_f$ has the high value "1" is passed through AND gate 35 as a gating signal $S_g$ (FIG. 4I) for opening the gate 27 and passing the pilot signal $P_s$ through mixing circuit 28 to auxiliary head 15 (FIG. 4K). Thus, as previously indicated, the pilot signal is recorded in the areas $A_1$, $A_2$, ... etc. on tape 11 only during alternate revolutions of head 15 with drum 12. The gating signal $S_g$ is further applied to an inverter 36 to provide an inverted gating signal $\overline{S}_g$ (FIG. 4J) which is effective to open the gate 29 at all times when the gate 27 is closed. Thus, the erase signal $E_s$ is passed through gate 29 and mixing circuit 28 to auxiliary rotary head 15 except when the pulse signal $P_s$ is being applied to such head 15.

In order to control the switching circuit 20, the output $Sm_2$ of monostable multivibrator 33 is applied to a monostable multivibrator 37 which is triggered by the negative going side of output $Sm_2$ for producing an output $Sm_3$ (FIG. 4E) which, at its negative going or falling side, sets a flip-flop 38. Further, each reference signal pulse $P_{G2}$ from pulse generator 30B triggers from a monostable multivibrator 39 to produce an output $Sm_4$ (FIG. 4G) which, at its negative going or falling side resets flip-flop 38. Thus, the output $S_c$ (FIG. 4H) of flip-flop 38 which is applied to switching circuit 20 for controlling the latter has a high or "1" value and a low or "0" value for alternate field intervals of the video signals being recorded, with the "1" value of the flip-flop output $S_c$ causing switching circuit 20 to apply the video signals to head 13A while the "0" value of output $S_c$ causes switching circuit 20 to apply the video signals to head 13B. Further, it will be seen that flip-flop 38 is set to establish the "1" value of its output $S_c$ at the negative-going side of output $Sm_3$ from monostable multivibrator 37, that is, at the instant when head 13A has traversed the edge portion 21 of magnetic tape 11, and thus is positioned to commence recording of video signals in a respective tracks $T_{A1}$, $T_{A2}$, ... etc. On the other hand, flip-flop 38 is reset by the output $Sm_4$ to establish the value "0" of the flip-flop output $S_c$ at the instant when head 13B has traversed edge portion 21 of tape 11 and thus is positioned to commence recording of video signals in a respective one of the tracks $T_{B1}$, $T_{B2}$, ... etc.

In the reproducing or playback operation of the apparatus 10 according to this invention, the rotary heads 13A and 13B again repeatedly traverse the full width of magnetic tape 11 while the latter is being advanced for reproducing the video signals recorded in the successive parallel tracks $T_{A1}$, $T_{B1}$, $T_{A2}$, $T_{B2}$, ... etc. Further, with the pilot signals $P_s$ recorded in the areas $A_1$, $A_2$, $A_3$ ... etc. spaced apart along the edge portion 21 of tape 11 and being each positionally related, in the direction of tape advancement, to a respective plurality of the successive parallel tracks as described above and shown on FIG. 2, each of the rotary heads 13A and 13B is further operative, in the reproducing or playback operation of the apparatus according to this invention, to provide a reproduced pilot signal during each traversal by the head 13A or 13B of an area $A_1$, $A_2$, $A_3$, ... etc. on the edge portion 21. Further, in accordance with this invention, the reproduced pilot signals obtained during two different traversals of each one of the areas $A_1$, $A_2$, $A_3$ . . . etc. are compared, preferably as to the level thereof, to provide a control signal on the basis of such comparison, with the control signal then being employed for regulating the advancement of the magnetic tape or record medium 11 relative to the repeated traversing thereof by the rotary heads 13A and 13B so as to maintain accurate scanning of the successive parallel tracks $T_{A1}$, $T_{B1}$, $T_{A2}$, $T_{B2}$, . . . etc. by the heads 13A and 13B.

Figure 6:
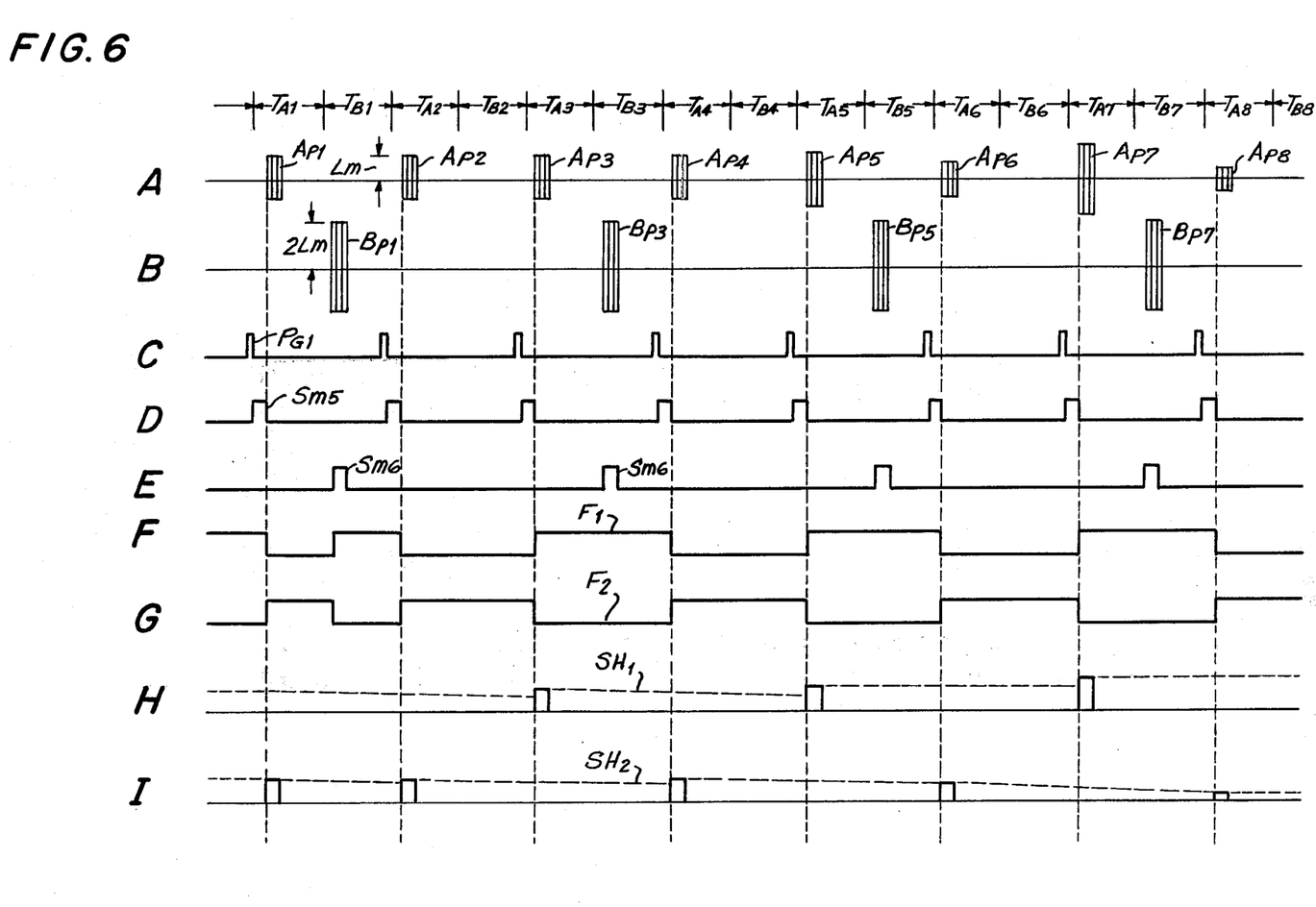
FIG. 6, consisting of 6A through 6I, is a series of waveform diagrams to which reference will be made in explaining the operation of the reproducing circuit of FIG. 5.

When the heads 13A and 13B are accurately scanning or tracking the respective successive parallel tracks in which video signals are recorded, for example, when head 13A accurately scans tracks $T_{A1}$ and $T_{A2}$ as indicated at $13A_1$ and $13A_2$ on FIG. 2, and head 13B accurately scans track $T_{B1}$, as indicated at $13B_1$, the opposite end portions of area $A_1$ having the pilot signal $P_s$ recorded therein will extend half-way across the gap width D of head 13A when being traversed by the latter. On the other hand, the head 13B, in traversing the middle portion of area $A_1$ will be exposed to the recorded pilot signal along its entire gap width D. Therefore, when head 13A accurately scans the first and last tracks $T_{A1}$ and $T_{A2}$ associated with the recorded area $A_1$ of the pilot signals, the respective reproduced pilot signals $A_{P1}$ and $A_{P2}$ (FIG. 6A) obtained from head 13A have the same level $L_m$, while the reproduced pilot signal $B_{P1}$ (FIG. 6B) obtained from head 13B when accurately scanning the track $T_{B1}$ has the level $2L_m$.

On the other hand, if the rotary heads 13A and 13B do not accurately track or scan the successive parallel record tracks during the reproducing or playback operation, for example, as indicated at $13A_5$, $13B_5$, $13A_6$, $13B_6$, $13A_7$, $13B_7$ and $13A_8$ relative to the tracks $T_{A5}$, $T_{B5}$, $T_{A6}$, $T_{B6}$, $T_{A7}$, $T_{B7}$ and $T_{A8}$, respectively, on FIG. 2, then the reproduced pilot signals from rotary head 13A, when traversing the opposite end portions, respectively, of each of the pilot signal record areas $A_3$ and $A_4$ will have levels that are different from each other and a comparison of such reproduced pilot signals will result in a control signal by which the speed of advancement of tape 11 can be varied in the direction to restore accurate scanning of the successive parallel record tracks by the rotary heads 13A and 13B. In the example of inaccurate tracking shown on FIG. 2, the heads 13A and 13B traverse tape 11 along paths that are relatively delayed in respect to the positions of the respective parallel record tracks. Therefore, when head 13A, in the position indicated at $13A_5$, traverses the leading end portion of pilot signal record area $A_3$, such head 13A is exposed to the recorded pilot signal along more than one-half of its gap width. Conversely, when head 13A, in the position indicated at $13A_6$, traverses the trailing end portion of area $A_3$, such head 13A is exposed to the recorded pilot signal along less than one-half of its gap width. Therefore, as indicated at FIG. 6A, the reproduced pilot signal $A_{P5}$ derived from head 13A in traversing the leading end portion of area $A_3$ has a level greater than the level of the reproduced pilot signal $A_{P6}$ derived from head 13A in traversing the trailing end portion of area $A_3$. Accordingly, the control signal that results from comparison of the relatively high level reproduced pilot signal $A_{P5}$ with the relatively low level reproduced pilot signal $A_{P6}$ can be employed to vary the speed of advancement of tape 11, that is, to slow down the tape advancement in the example illustrated on FIG. 2, so as to restore accurate scanning of the successive parallel tracks in which the video signals are recorded.

It will be apparent that, in the embodiment of the invention illustrated on FIGS. 1 and 2, tracking errors do not influence the level of the reproduced pilot signals derived from the head 13B. Further, the head 13B produces reproduced pilot signals, as at $B_{P1}$, $B_{P3}$, $B_{P5}$ and $B_{P7}$ on FIG. 6B, only during alternate revolutions of drum 12, that is, when head 13B more or less accurately scans the tracks $T_{B1}$, $T_{B3}$, $T_{B5}$ and $T_{B7}$, respectively, so as to traverse the middle portions of pilot signal record areas $A_1$, $A_2$, $A_3$ and $A_4$.

As shown generally on FIG. 1, in the reproducing or playback mode of operation of apparatus 10, mode selecting switch 19 is changed over to engage its playback contacts P with the result that signals being reproduced by rotary heads 13A and 13B are respectively applied to playback amplifiers 40 and 41. The outputs of amplifiers 40 and 41 are applied to a frequency demodulator 42 for deriving therefrom the reproduced video signals which are obtained at an output terminal 43. The outputs of amplifiers 40 and 41 are further applied to a servo-control circuit 44 which responds to the previously described reproduced pilot signals contained in such outputs for maintaining accurate tracking or scanning of the successive parallel record tracks by the heads 13A and 13B.

Figure 5:
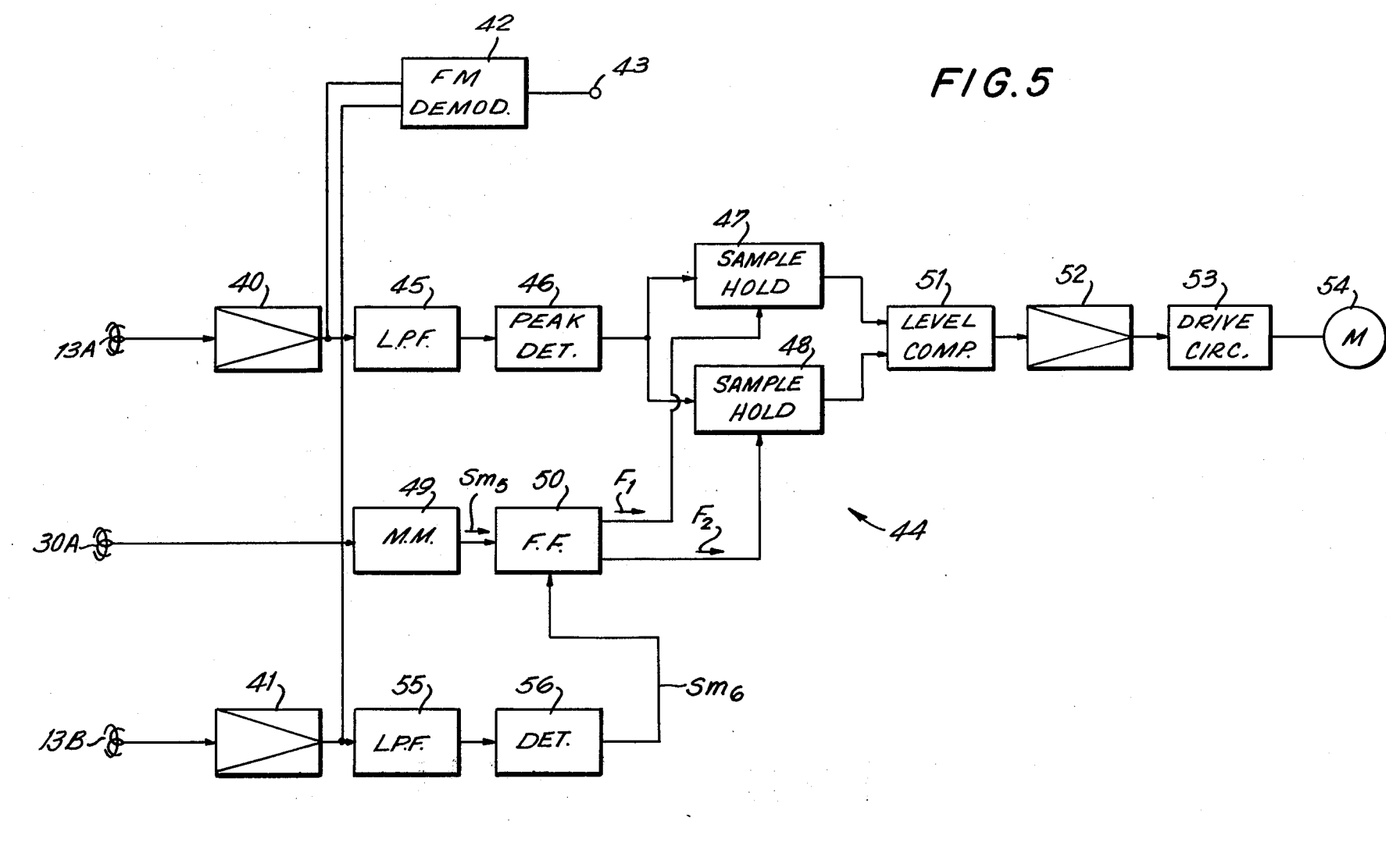
FIG. 5 is a schematic view of a reproducing circuit included in the apparatus of FIG. 1.

Referring now to FIG. 5, it will be seen that a suitable arrangement of the servo-control circuit 44 for maintaining accurate tracking or scanning during reproducing or playback operation in accordance with this invention may include a low-pass filter 45 which receives the output of amplifier 40 and separates therefrom the reproduced pilot signals derived from rotary head 13A. The thus separated reproduced pilot signals are supplied from filter 45 to a peak detector 46 and the output of the latter is applied to two sampling and holding circuits 47 and 48. Further, during reproducing or playback operation, the reference pulse signals $P_{G1}$ are supplied from pulse generator 30A to a monostable multivibrator 49 which is triggered by such reference pulse signals $P_{G1}$ (FIG. 6C) to provide outputs $Sm_5$ (FIG. 6D). The outputs $Sm_5$ are applied to a flip-flop 50 which provides outputs or sampling pulses $F_1$ and $F_2$ of opposite polarity (FIGS. 6F and 6G), with the states of the outputs or sampling pulses $F_1$ and $F_2$ being reversed normally in response to the successive outputs $Sm_5$ received by flip-flop 50. The outputs or sampling pulses $F_1$ and $F_2$ are applied to the sampling and holding circuits 47 and 48, respectively, so that the circuits 47 and 48 are made to sample and hold the peak levels $SH_1$ and $SH_2$ (FIGS. 6H and 6I) detected by peak detector 46 at the times when the respective sampling pulses $F_1$ and $F_2$ are at their positive or relatively high values. The peak levels $SH_1$ and $SH_2$ (FIGS. 6H and 6I) of the reproduced pilot signals which are sampled and held by the circuits 47 and 48, respectively, are applied to a level comparator 51 which, in response to a difference between the detected levels, provides a differential or control signal. Such control signal, of course, corresponds to the mistracking of the successive parallel record tracks $T_{A1}$, $T_{A2}$, $T_{A3}$, . . . etc. by the head 13A and is supplied through an amplifier 52 to a drive circuit 53 which, for example, controls the speed of rotation of an electric motor 54 for driving the capstan (not shown) by which advancement of tape 11 in the direction 23 is effected.

The servo-control circuit 44 according to this invention is further shown to include a pre-setting circuit for the flip-flop 50 which ensures that, upon commencement of a reproducing or playback operation of apparatus 10, the initial state of flip-flop 50 will result in the sampling by circuits 47 and 48 of the reproduced pilot signals derived from rotary head 13A during the traversing by the latter of the leading and trailing end portions, respectively, of the pilot signal record areas $A_1$, $A_2$ . . . etc. As shown, such pre-setting circuit includes a low-pass filter 55 receiving the output of amplifier 41, that is, the signals reproduced by rotary head 13B, and a detecting circuit 56 for detecting the reproduced pilot signals $B_{p1}$, $B_{p3}$, $B_{p5}$ . . . etc. in the output of filter 55. Thus, detector 56 provides a pre-setting pulse $Sm_6$ (FIG. 6E) upon the detection of each reproduced pilot signal derived from the head 13B, and each such pre-setting pulse $Sm_6$ is applied to flip-flop 50 for setting the latter to the state in which the outputs or sampling pulses $F_1$ and $F_2$ are at their high and low levels, respectively. Thus, if at the commencement of a playback operation, that is, during the scanning of the track $T_{A1}$ by the head 13A, the flip-flop 50 is in the incorrect state so as to provide its outputs $F_1$ and $F_2$ with low and high values, respectively, as shown at the left-hand portions of FIGS. 6F and 6G, so that the reproduced pilot signals $A_{p1}$ and $A_{p2}$ would be sampled by circuit 48 and circuit 47, respectively, rather than by circuits 47 and 48, as desired, the first pre-setting pulse $Sm_6$ received by flip-flop 50 will reverse the state of the latter to provide the correct values of its outputs $F_1$ and $F_2$. Thereafter, the level comparator 51 can correctly compare the levels of the reproduced pilot signals obtained during the traversal by the head 13A of the leading and trailing end portions of a single pilot signal record area, rather than comparing the levels of the reproduced pilot signals obtained when the head 13A traverses the trailing end portion of one pilot signal record area, for example, the area $A_1$, and the leading end portion of the next area $A_2$.

Of course, if the state of the flip-flop 50 is correct, that is, if the outputs $F_1$ and $F_2$ are relatively high and low, respectively, upon the reception by the flip-flop 50 of a pre-setting pulse, for example, as indicated at $Sm_6'$ (FIG. 6E), the state of flip-flop 50 is unchanged by such pre-setting pulse.

It will be apparent that, in the servo-control system according to this invention, as described above, rotary heads are employed for recording and reproducing the pilot signals on the magnetic tape or other record medium so that the speed of movement of such heads relative to the tape or record medium, and hence the level and signal to noise ratio of the reproduced pilot signals, are not influenced significantly by the speed of advancement of the tape or record medium in the direction 23. By reason of the foregoing, the servo-control system according to this invention can be effectively employed for reliably maintaining accurate scanning of the successive parallel record tracks by the rotary heads 13A and 13B during playback even when a very low speed of advancement of the tape in the direction 23 is used for minimizing the jetter component of the reproduced video signals. Furthermore, as previously noted, the servo-control is effected on the basis of a comparision of the levels of the reproduced pilot signals obtained during traversal of the leading and trailing end portions of each area in which the pilot signals are recorded. Thus, the servo-control is less influenced by jitter introduced in the direction of movement of the rotary heads 13A and 13B by the motor driving the tape guide drum 12 than would be the case if the servo-control was effected on the basis of a comparison of the phases of the reproduced pilot signals.

In the embodiment of the invention described above with reference to FIGS. 1-6, only two substantially diametrically opposed rotary recording and reproducing heads 13A and 13B are associated with the drum 12 for alternately traversing the tape 11 as the latter is longitudinally advanced. However, it is to be understood that a servo-control system according to this invention may be similarly applied to a recording and/or reproducing apparatus of the type in which three or more equally spaced rotary recording and reproducing heads are associated with the tape guide drum.

Figure 7:
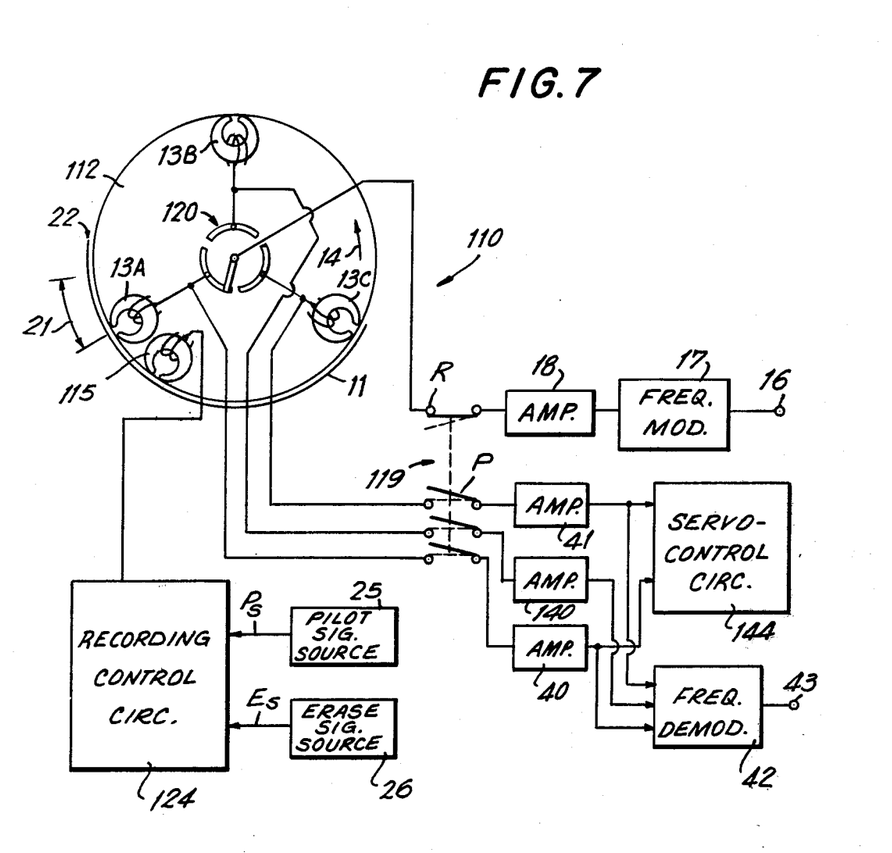
FIG. 7 is a schematic view similar to that of FIG. 1, but showing an apparatus according to another embodiment of this invention.

For example, as shown on FIG. 7, a servo-control system according to this invention may be applied to a recording and reproducing apparatus 110 which is generally similar to the previously described apparatus 10 and has its corresponding parts identified by the same reference numerals, but in which the tape guide drum 112 has three equally spaced apart rotary recording and reproducing heads 13A, 13B and 13C and an auxiliary rotary head 115 arranged in advance of the head 13A considered in the direction of rotation of drum 112 indicated by the arrow 14. In the apparatus 110, the transversely curved magnetic tape 11 is wrapped about a portion of the periphery of drum 112 which is greater, by the distance 21, than the 120° angular extent between the successive heads 13A, 13B and 13C. In recording video signals with the apparatus 110, tape guide drum 112 and the associated rotary heads are rotated at a suitable speed so that each of the heads 13A, 13B and 13C can record one field of the video signals in a respective track extending transversely across tape 11 during movement of the respective head 13A, 13B or 13C through an angular extent of 120°. Thus, each of heads 13A, 13B and 13C can record a field of video signals in a respective track which extends across less than the full width of the magnetic tape.

As in the previously described embodiment, the video signals to be recorded are received at an input terminal 16, and frequency modulated in a modulator 17 prior to being supplied through a recording amplifier 18 to a mode selecting switch 119. When mode selecting switch 119 is disposed to engage its record contact R for selecting recording operation of apparatus 10, the frequency modulated video signals are passed to a switching means 120 by which the video signals to be recorded are alternately applied in a cyclically repeating order to the rotary heads 13A, 13B and 13C in accordance with the rotational positions of such heads. Preferably, switching means 120 is arranged to apply the video signals to be recorded to each of the heads 13A, 13B and 13C only after such head has moved in the distance 21 past the longitudinal or side edge 22 of magnetic tape 11. Thus, as heads 13A, 13B and 13C traverse the advancing magnetic tape 11 in a cyclically repeating order, the successive parallel tracks $T_{A1}$, $T_{B1}$, $T_{C1}$, $T_{A2}$, $T_{B2}$, $T_{C2}$, . . . etc. in which fields of the video signals are respectively recorded by heads 13A, 13B and 13C are spaced, at one end, by the distance 21 from the adjacent longitudinal edge or margin 22 of the magnetic tape (FIG. 8).

Figure 8:
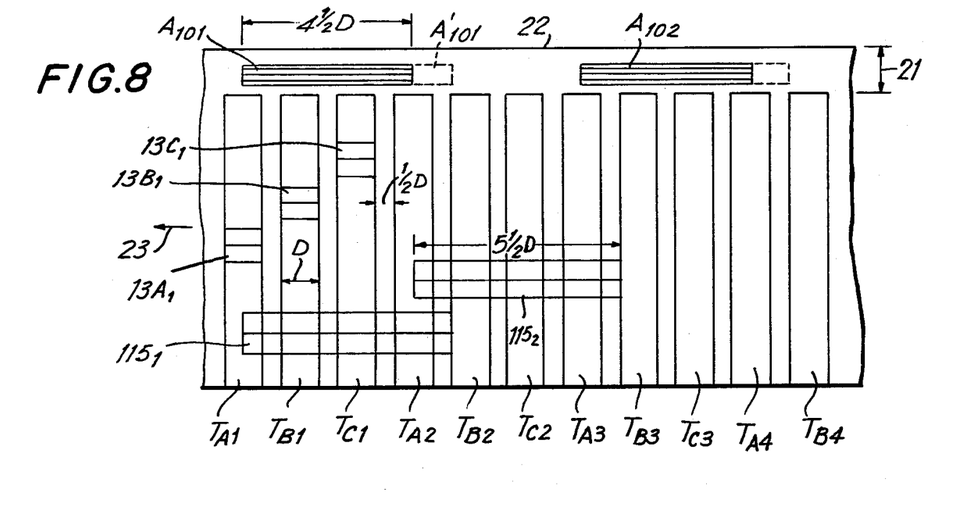
FIG. 8 is a view similar to that of FIG. 2, but showing the arrangement of record tracks and pilot signal areas on a record medium used in connection with the apparatus of FIG. 7.

As before, the auxiliary rotary head 15 which repeatedly traverses tape 11 in coordination with the rotary heads 13A, 13B and 13C is employed, during recording operation of apparatus 110, for recording pilot signals $P_s$ in areas $A_{101}$, $A_{102}$, ... etc. that are spaced apart in the direction of advancement of the tape, indicated by the arrow 23 on FIG. 8, on the edge portion of tape 11 between longitudinal edge or margin 22 and the adjacent ends of the successive parallel tracks. Each of the areas $A_{101}$, $A_{102}$, ... etc. is again shown to have a length or extent in the direction 23 of tape 11 that corresponds, and is in a predetermined positional relation to the respective plurality of the successive parallel record tracks in which the video signals are recorded by the heads 13A, 13B and 13C. More particularly, if the rotary heads 13A, 13B and 13C have gap widths D for determining the widths of the successive parallel tracks in which the video signals are recorded, while the speed of advancement of tape 11 during recording operation is selected to provide guard bands having a width of $\frac{1}{2}$D between the adjacent record tracks, each of the areas $A_{101}$, $A_{102}$, ... etc. in which pilot signals are recorded has a length or extent in the direction of advancement of the tape equal to $4\frac{1}{2}$D and is longitudinally disposed in respect to the associated record tracks so that the opposite end portions of each area having the pilot signals recorded therein extend approximately half-way across the widths of the first and last tracks of the respective plurality of the successive parallel tracks. Thus, in the case of the area $A_{101}$ having the pilot signal recorded therein, the successive parallel tracks associated with that area are indicated at $T_{A1}$, $T_{B1}$, $T_{C1}$ and $T_{A2}$, and the opposite end portions of the area $A_{101}$ extend approximately half-way across the widths of the first and last tracks $T_{A1}$ and $T_{A2}$ of the plurality of successive parallel tracks associated with the area $A_{101}$. It will also be seen on FIG. 8 that the successive areas $A_{101}$, $A_{102}$, ... etc. having pilot signals recorded therein are spaced from each other by distances equal to the lengths or extents of such areas in the direction 23 of advancement of the tape, that is, by distances $4\frac{1}{2}$D.

Furthermore, in the apparatus 10, the auxiliary rotary head 115 also functions, during the recording operation, as an erasing head. Thus, as in the previously described embodiment, during the recording operation of apparatus 110, a recording control circuit 124 (FIG. 7) functions to selectively apply to head 115 either the pilot signal $P_s$ from a suitable source 25 thereof or an erasing signal $E_s$ from a source 26 of the latter. More particularly, the recording control circuit 124, which may be similar to the previously described circuit 24, is operative to apply the pilot signal $P_s$ to auxiliary head 115 only during alternate revolutions of such head with drum 112 as head 115 traverses the edge portion of tape 11 adjacent longitudinal margin 22 thereof, and the circuit 124 is operative, at all other times, to apply the erasing signal $E_s$ to auxiliary head 115. Furthermore, as shown particularly on FIG. 8, auxiliary head 115 has a gap width in the direction 23 of advancement of the tape equal to $5\frac{1}{2}$D, and such head 115 is located in the direction of the axis of drum 112 relative to head 13A so that, as head 115 traverses tape 11 during one revolution of drum 112, as indicated at $115_1$ on FIG. 8, the area traversed by head 115 will overlap by $\frac{1}{2}$D the track $T_{A1}$ that is thereafter scanned by the head 13A during the same revolution of drum 112. Moreover, when the auxiliary head 115 has a gap width of $5\frac{1}{2}$D, as shown, the areas traversed by the auxiliary head in successive revolutions, as indicated at $115_1$ and $115_2$ on FIG. 8, will overlap by the distance D. Therefore, if the pilot signal $P_s$ is applied to auxiliary head 115 when moving across the edge portion of tape 11 in the position indicated at $115_1$ relative to the tape for recording the pilot signal in a respective area on the tape, during the next revolution of drum 112, the auxiliary head will be disposed as indicated at $115_2$ relative to the tape and, in moving across the edge portion of the tape, will erase the trailing end portion, as indicated in broken lines at $A_{101}'$, of the area in which the pilot signal was recorded during the previous revolution of drum 112.

In the reproducing or playback operation of the apparatus 110 according to this invention, the rotary heads 13A, 13B and 13C again repeatedly traverse the full width of magnetic tape 11 while the latter is being advanced for reproducing the video signals recorded in the successive parallel tracks $T_{A1}$, $T_{B1}$, $T_{C1}$, $T_{A2}$, $T_{B2}$, $T_{C2}$, ... etc., and for providing a reproduced pilot signal during each traversal by the head 13A, 13B or 13C of an area $A_{101}$, $A_{102}$, ... etc. on the edge portion 21 of the tape, Further, the reproduced pilot signals obtained during two different traversals of each one of the areas $A_{101}$, $A_{102}$, ... etc. are compared, preferably as to the level thereof, to provide a control signal on the basis of such comparison, with the control signal then being employed for regulating the advancement of the magnetic tape or record medium 11 relative to the repeated traversing thereof by the rotary heads 13A, 13B and 13C so as to maintain accurate scanning of the successive parallel tracks $T_{A1}$, $T_{B1}$, $T_{C1}$, $T_{A2}$, $T_{B2}$, $T_{C2}$, ... etc. by the heads 13A, 13B and 13C.

Figure 9:
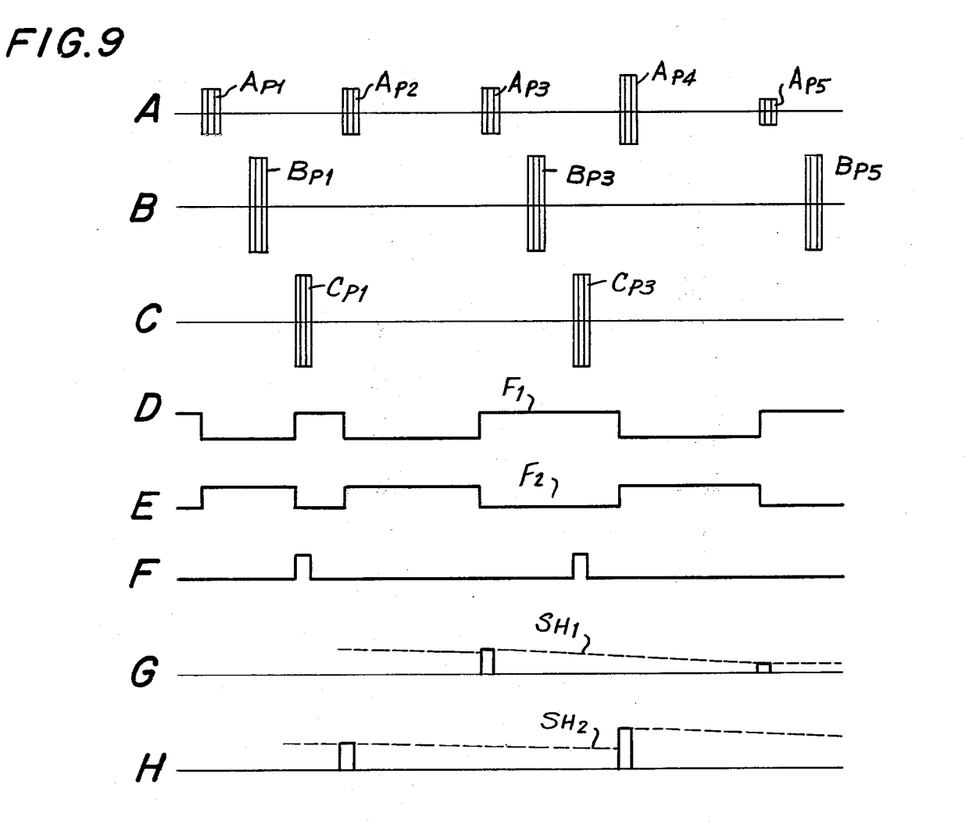
FIG. 9, consisting of 9A through 9H, is a series of waveform diagrams to which reference will be made in explaining the operation of the apparatus of FIG. 7.

When the heads 13A, 13B and 13C are accurately scanning or tracking the respective successive parallel tracks in which video signals are recorded, for example, when heads 13A, 13B and 13C accurately scan tracks $T_{A1}$, $T_{B1}$ and $T_{C1}$, as indicated at $13A_1$, $13B_1$ and $13C_1$ on FIG. 8, the opposite end portions of area $A_{101}$ having the pilot signal $P_s$ recorded therein will extend half-way across the gap width D of head 13A when being traversed by the latter. On the other hand, the heads 13B and 13C in traversing the middle portion of area $A_{101}$ will each be exposed to the recorded pilot signal along its entire gap width D. Therefore, when head 13A accurately scans the first and last tracks $T_{A1}$ and $T_{A2}$ associated with the recorded area $A_{101}$ of the pilot signals, the respective reproduced pilot signals $A_{P1}$ and $A_{P2}$ (FIG. 9A) obtained from head 13A have the same level $L_m$, while the reproduced pilot signals $B_{P1}$ and $C_{P1}$ (FIGS. 9B and 9C) obtained from heads 13B and 13C when accurately scanning the tracks $T_{B1}$ and $T_{C1}$ have the level $2L_m$.

On the other hand, if the rotary heads 13A, 13B and 13C do not accurately track or scan the successive parallel record tracks during the reproducing or playback operation, then the reproduced pilot signals from rotary head 13A, when traversing the opposite end portions, respectively, of each of the pilot signal record areas will have levels that are different from each other, for example, as indicated at $A_{P4}$ and $A_{P5}$ on FIG. 9A, and a comparison of such reproduced pilot signals will result in a control signal by which the speed of advancement of tape 11 can be varied in the direction to restore accurate scanning of the successive parallel record tracks by the rotary heads 13A, 13B and 13C.

It will be apparent that, in the apparatus 110, tracking errors again do not influence the level of the reproduced pilot signals (FIGS. 9B and 9C) derived from the heads 13B and 13C. Further, the heads 13B and 13C produce reproduced pilot signals, as at $B_{P1}$, $B_{P3}$, $B_{P5}$ on FIG. 9B, and as at $C_{P1}$ and $C_{P3}$ on FIG. 9C, only during alternate revolutions of drum 112, that is, when heads 13B and 13C traverse the middle portions of pilot signal record areas $A_{101}$, $A_{102}$, ... etc.

As shown generally on FIG. 7, in the reproducin or playback mode of operation of apparatus 110, mode selecting switch 119 is changed over to engage its playback contacts P with the result that signals being reproduced by rotaty heads 13A, 13B and 13C are respectively applied to playback amplifiers 40, 140 and 41. The outputs of amplifiers 40, 140 and 41 are applied to a frequency demodulator 42 for deriving therefrom the reproduced video signals which are obtained at an output terminal 43. The outputs of amplifiers 40, 140 and 41 are further applied to a servo-control circuit 144 which may be similar to the circuit 44 of apparatus 10, and which similarly responds to the previously described reproduced pilot signals contained in such outputs for maintaining accurate tracking or scanning of the successive parallel record tracks by the heads 13A, 13B and 13C.

More particularly, in the servo-control circuit 144, a flip-flop (not shown) similar to the flip-flop 50 of circuit 44 may provide outputs or sampling pulses $F_1$ and $F_2$ (FIGS. 9D and 9E) of opposite polarities which, as before, are reversed in response to the reference pulse signals, such as, the signals $P_{G1}$, indicating the rotational position of head 13A. The sampling pulses $F_1$ and $F_2$ are again applied to sampling and holding circuits (not shown) similar to the circuits 47 and 48 on FIG. 5 so that such sampling and holding circuits are made to sample and hold the peak levels $SH_1$ and $SH_2$ (FIGS. 9G and 9H) of the reproduced pilot signals separated from the output of head 13A when the respective sampling pulses $F_1$ and $F_2$ are at their positive or relatively high values. The peak levels $SH_1$ and $SH_2$ of the reproduced pilot signals which are sampled and held are again applied to a level comparator which, in response to a difference between the detected levels, provides a differential or control signal. Such control signal, of course, corresponds to the mistracking of the successive parallel record tracks $T_{A1}, T_{A2}, T_{S3}, \ldots$ etc. by the head 13A and, as in the circuit 44, is supplied through an amplifier to a drive circuit which, for example, controls the speed of rotation of an electric motor for driving the capstan by which advancement of tape 11 in the direction 23 is effected.

The servo-control circuit 144 similar to the circuit 44 of FIG. 5 preferably includes a pre-setting circuit which ensures that, upon commencement of a reproducing or playback operation of apparatus 110, the initial state of the flip-flop providing the sampling pulses $F_1$ and $F_2$ will result in the sampling of the reproduced pilot signals derived from rotary head 13A during the traversing by the latter of the leading and trailing end portions, respectively, of the pilot signal record areas $A_{101}, A_{102}, \ldots$ etc. Such pre-setting circuit of servo-control circuit 144 may be similar to that provided in circuit 44, except that it detects the reproduced pilot signals $C_{P1}, C_{P3} \ldots$ etc. in the output of rotary head 13C to produce pre-setting pulses (FIG. 9F) which are applied to the flip-flop producing the sampling pulses $F_1$ and $F_2$ for setting such flip-flop to the state in which the outputs or sampling pulses $F_1$ and $F_2$ are at their high and low levels, respectively. Thus, if at the commencement of a playback operation, that is, during the scanning of the track $T_{A1}$ by the head 13A, the flip-flop is in the incorrect state so as to provide its outputs $F_1$ and $F_2$ with low and high values, respectively, as shown at the left-hand portions of FIGS. 9D and 9E, the first pre-setting pulse (FIG. 9F) received by the flip-flop will reverse the state of the latter to provide the correct value of its outputs $F_1$ and $F_2$. Thereafter, the level comparator of circuit 144can correctly compare the levels of the reproduced pilot signals obtained during the traversal by head 13A of the leading and trailing end portions of a single pilot signal record area, rather than comparing the levels of the reproduced pilot signals obtained when the head 13A traverses the trailing end portion and the leading end portion of two successive pilot signal record areas, respectively.

It will be noted that, although the reproduced pilot signals (FIG. 9C) obtained from the rotary head 13C are used in the servo-control circuit 144 to produce the pre-setting pulses or signals (FIG. 9F), such pre-setting pulses may be generated instead by the reproduced pilot signals (FIG. 9B) obtained from the rotary head 13B.

In the apparatus 10 and 110, the auxiliary head 15 or 115 is used both to record the pilot signals $P_s$ and to erase the signals that may have been previously recorded on the tape. However, as shown on FIG. 10, in an apparatus 210 according to this invention, the tape guide drum 212 may be provided with two auxiliary rotary heads 215' and 215 which respectively function as an erasing head and a pilot signal recording head and which are arranged in succession in advance of the rotary recording and reproducing head 13A. It will be seen that the apparatus 210 is generally similar to the apparatus 10 of FIG. 1 and has its corresponding parts identified by the same reference numerals. Thus, in the apparatus 210 the video signals to be recorded are received at an input terminal 16 and frequency modulated in a modulator 17 prior to being supplied through a recording amplifier 18 to a mode selecting switch 19. When mode selecting switch 19 is disposed to engage its record contact R for selecting recording operation of apparatus 210, the frequency modulated video signals are passed to the switching means 20 by which the video signals to be recorded are alternately applied to the rotary heads 13A and 13B in accordance with the rotational positions of such heads. As previously described, switching means 20 is arranged to apply the video signals to be recorded to each of the heads 13A and 13B only after such head has moved the distance 21 past the longitudinal or side edge 22 of magnetic tape 11. Thus, as heads 13A and 13B traverse the advancing magnetic tape 11 in a cyclically repeated order, the successive parallel tracks $T_{A1}, T_{B1}, T_{A2}, T_{B2}, \ldots$ etc. in which fields of the video signals are respectively recorded by heads 13A and 13B are spaced, at one end, by the distance 21 from the adjacent longitudinal edge or margin 22 of the magnetic tape (FIG. 11).

As before, the auxiliary rotary head 215 which repeatedly traverses tape 11 in coordination with the rotary heads 13A and 13B is employed, during recording operaton o apparatus 210, for recording pilot signals $P_s$ in areas $A_{201}, A_{202}, \ldots$ etc. that are spaced apart in the direction of advancement of the tape on the edge portion of tape 11 between longitudinal edge or margin 22 of and the adjacent ends of the successive parallel tracks. Each of the areas $A_{201}, A_{202}, \ldots$ etc. is again shown to have a length or extent in the direction 23 of tape 11 that corresponds, and is in a predetermined positional relation to a respective plurality of the successive parallel record tracks in which the video signals are recorded by the heads 13A and 13B. More particularly, in the apparatus 210, if the rotary heads 13A and 13B have gap widths D for determining the widths of the successive parallel tracks in which the video signals are recorded, while the speed of advancement of tape 11 during recording operation is selected to provide guard bands having a width of ½D between the adjacent record tracks, each of the areas $A_{201}$, $A_{202}$, ... etc. in which pilot signals are recorded has a length or extent in the direction of advancement of the tape equal to 1½D and is longitudinally disposed in respect to the associated record tracks so that the opposite end portions of each area having the pilot signals recorded therein extend approximately half-way across the widths of the first and last tracks of the respective plurality of the successive parallel tracks. Thus, in the case of the area $A_{201}$ having the pilot signal recorded therein, the successive parallel tracks associated with that area are indicated at $T_{A1}$ and $T_{B1}$, and the opposite end portions of the area $A_{201}$ extend approximately half-way across the widths of the first and last tracks $T_{A1}$ and $T_{B1}$ of the plurality of successive parallel tracks associated with the area $A_{201}$. It will also be seen on FIG. 11 that the successive areas $A_{201}$, $A_{202}$, ... etc. having pilot signals recorded therein are spaced from each other by distances equal to the lengths or extents of such areas in the direction 23 of advancement of the tape, that is, by distances 1½D.

Since the apparatus 210 employs an erasing head 215' that is separate from the head 215 for recording the pilot signals, the recording control circuit 224 need only control the selective application of the pilot signal $P_s$ from source 25 to head 215, and thus may correspond to the circuit 24 on FIG. 3, but with the mixing circuit 28, gate 29 and inverter 36 being omitted therefrom. With the erasing head 215' disposed in advance of the pilot signal recording head 215, the erasing signal $E_s$ may be applied directly from its source 26 to head 215', as shown on FIG. 10, and the gap width of the head 215 may correspond to the length of each of the areas $A_{201}$, $A_{202}$, ... etc. in which the pilot signals are to be recorded.

In the reproducing or playback operation of the apparatus 210 according to this invention, the rotary heads 13A and 13B again repeatedly traverse the full width of magnetic tape 11 while the latter is being advanced for reproducing the video signals recorded in the successive parallel tracks $T_{A1}$, $T_{B1}$, $T_{A2}$, $T_{B2}$, ... etc., and for providing a reproduced pilot signal during each traversal by the head 13A or 13B of an area $A_{201}$, $A_{202}$, ... etc. on the edge portion 21 of the tape. Further, the reproduced pilot signals obtained during two different traversals of each one of the areas $A_{201}$, $A_{202}$, ... etc. are again compared, preferably as to the level thereof, to provide a control signal on the basis of such comparison, with the control signal then being employed for regulating the advancement of the magnetic tape or record medium 11 relative to the repeated traversing thereof by the rotary heads 13A and 13B so as to maintain accurate scanning of the successive parallel record tracks.

Figure 13:
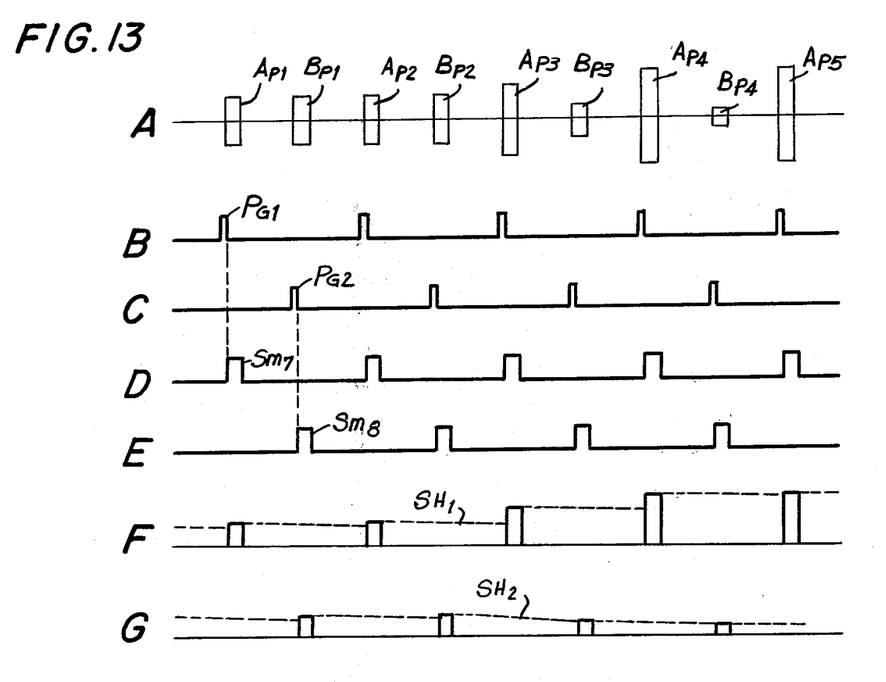
FIG. 13, consisting of 13A through 13B, shows a series of waveform diagrams to which reference will be made in explaining the operation of the reproducing circuit of FIG. 12.

When the heads 13A and 13B are accurately scanning or tracking the respective successive parallel tracks in which video signals are recorded, for example, when heads 13A and 13B accurately scan tracks $T_{A1}$ and $T_{B1}$, indicated at $13A_1$ and $13B_1$ on FIG. 11, the leading and trailing end portions of area $A_{201}$ having the pilot signal $P_s$ recorded therein will extend half-way across the gap widths D of heads 13A and 13B when being respectively traversed by the latter. Therefore, when heads 13A and 13B accurately scan the first and last tracks $T_{A1}$ and $T_{B1}$ associated with the pilot signal record area $A_{201}$, the respective reproduced pilot signals $A_{P1}$ and $B_{P1}$ (FIG. 13A) obtained from heads 13A and 13B have the same levels.

On the other hand, if the rotary heads 13A and 13B do not accurately track or scan the successive parallel record tracks during the reproducing or playback operation, then the reproduced pilot signals from rotary heads 13A and 13B when traversing the opposite end portions, respectively, of each of the pilot signal record areas will have levels that are different from each other, for example, as indicated at $A_{P3}$ and $B_{P3}$ on FIG. 13A, and a comparison of such reproduced pilot signals will result in a control signal by which the speed of advancement of tape 11 can be varied in the direction to restore accurate scanning of the successive parallel record tracks by the rotary heads 13A and 13B.

Figure 10:
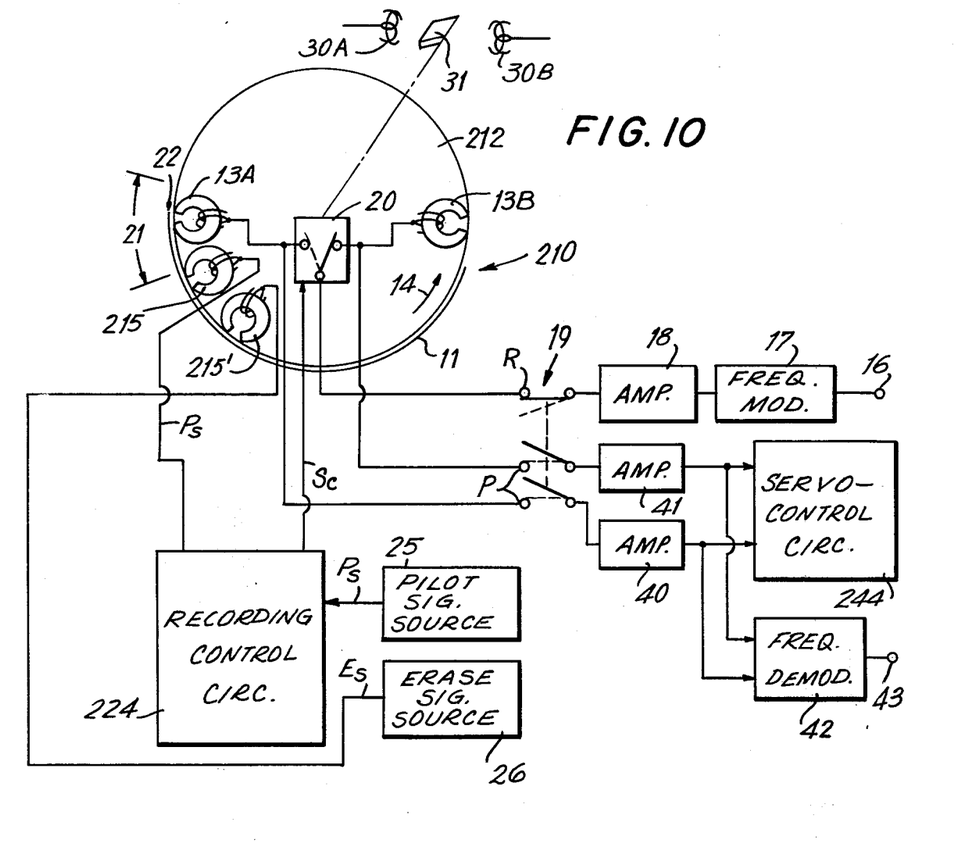
FIG. 10 is a schematic view similar to that of FIG. 1, but showing still another embodiment of this invention.
Figure 11:
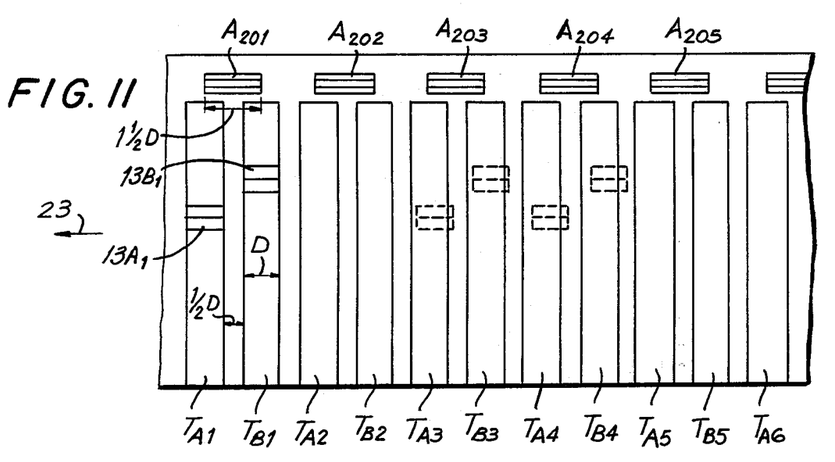
FIG. 11 is a schematic view similar to that of FIG. 2, but showing the arrangement of record tracks and areas containing pilot signals on a record medium used in connection with the apparatus of FIG. 10.

As shown generally on FIG. 10, in the reproducing or playback mode of operation of apparatus 210, mode selecting switch 19 is changed over to engage its playback contacts P with the result that signals being reproduced by rotary heads 13A and 13B are respectively applied to playback amplifiers 40 and 41. The outputs of amplifiers 40 and 41 are applied to frequency demodulator 42 for deriving therefrom the reproduced video signals which are obtained at an output terminal 43. The outputs of amplifiers 40 and 41 are further applied to a servo-control circuit 244 which responds to the previously described reproduced pilot signals contained in such outputs for maintaining accurate tracking or scanning of the successive parallel record tracks by the heads 13A and 13B.

Figure 12:
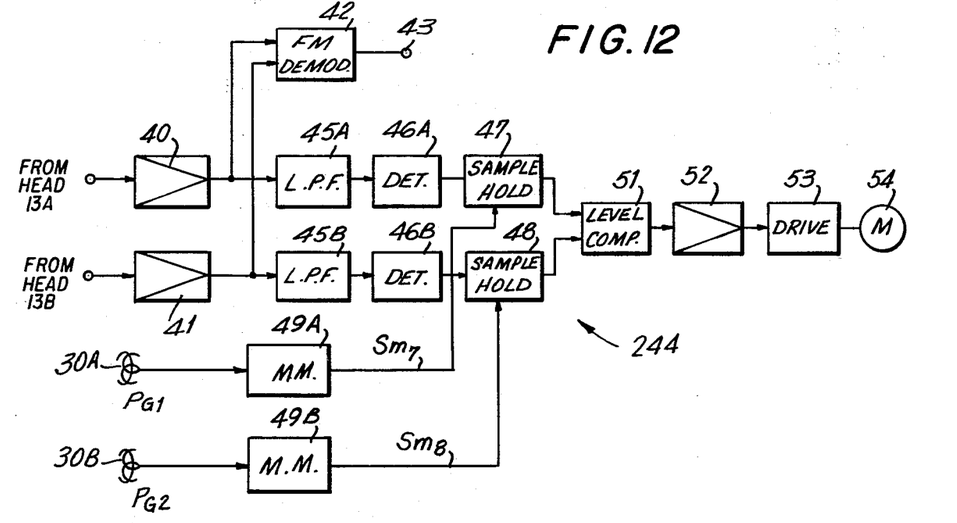
FIG. 12 is a schematic view illustrating the reproducing circuit of the apparatus of FIG. 10.

More particularly, in the servo-control circuit 244 (FIG. 12), low-pass filters 45A and 45B respectively receive the outputs of amplifiers 40 and separate therefrom the reproduced pilot signals derived from rotary heads 13A and 13B. The thus separated reproduced pilot signals are supplied from filters 45A and 45B to peak detectors 46A and 46B and the outputs of the latter are applied to respective sampling and holding circuits 47 and 48. Further, during reproducing or playback operation, the reference pulse signals $P_{G1}$ and $P_{G2}$ (FIGS. 13B and 13C) are supplied from pulse generators 30A and 30B to monostable multivibrators 49A and 49B which are triggered by such reference pulse signals $P_{G1}$ and $P_{G2}$ to provide outputs $Sm_7$ and $Sm_8$ (FIGS. 13D and 13E). The outputs $Sm_7$ and $Sm_8$ are applied to the sampling and holding circuits 47 and 48, respectively, as sampling pulses therefor, so that the circuits 47 and 48 are made to sample and hold the peak levels $SH_1$ and $SH_2$ (FIGS. 6F and 6G) detected by peak detectors 46A and 46B at the times when the respective sampling pulses $Sm_7$ and $Sm_8$ are at their positive or relatively high values. The peak levels $SH_1$ and $SH_2$ of the reproduced pilot signals which are sampled and held by the circuits 47 and 48, respectively, are again applied to level comparator 51 which, in response to a difference between the detected levels, provides a differential or control signal. Such control signal, of course, corresponds to the mistracking of the successive parallel record tracks $T_{A1}$, $T_{B1}$, $T_{A2}$, $T_{B2}$, ... etc. by the heads 13A and 13B and is supplied through amplifier 52 to drive circuit 53 which controls the speed of rotation of electric motor 54 for driving the capstan (not shown) by which advancement of tape 11 is effected.

In the apparatus 210, as described above, the reproduced pilot signals which have their levels compared in comparator 51 are derived from the heads 13A and 13B, respectively. Thus, each comparison can only be made with respect to the pilot signals reproduced from the leading and trailing end portions of a single pilot signal record area, and there is no need to provide the servo-control circuit 244 with a pre-setting circuit, as at 55 and 56 in the circuit 44 on FIG. 5.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus for recording and reproducing information signals on a record medium and which includes drive means for advancing the record medium in a predetermined direction during recording and reproducing operations of the apparatus, signal transducing means repeatedly traversing the record medium at a substantial angle to said direction of advancement of the record medium so as to scan successive parallel tracks on the latter, means for applying information signals to said signal transducing means during said recording operation for recording in said successive parallel tracks scanned by said transducing means, and means for deriving reproduced information signals from said signal transducing means when the latter scan said successive parallel tracks during said reproducing operation: a servo-control system for ensuring accurate scanning of said successive parallel tracks by said signal transducing means during said reproducing operation comprising pilot signal recording means operative during said recording operation of the apparatus for recording uniform pilot signals in areas on the record medium that are spaced apart in said direction of advancement and also traversed by said signal transducing means, with each of said areas having an extent in said direction of advancement that corresponds to the extent in said direction of advancement of a respective plurality of said successive parallel tracks being scanned by said signal transducing means during said recording operation, and with each of said areas further being in a predetermined positional relation, in said direction of advancement, to said respective plurality of parallel tracks; means operative during said reproducing operation of the apparatus for deriving a reproduced pilot signal from said signal transducing means during each traversal by the latter of each of said areas on the record medium; means for comparing the reproduced pilot signals derived from said signal transducing means during two different traversals of each one of said areas by said signal transducing means and providing a control signal on the basis of the comparison; and means responsive to said control signal for regulating said advancement of the record medium relative to the repeated traversing thereof by said signal transducing means.

2. An apparatus according to claim 1; in which said means for comparing the reproduced pilot signals includes means for sampling and holding the levels of said reproduced pilot signals derived from said signal transducing means during said two different traversals, respectively, and comparator means for comparing the sampled and held levels and providing said control signal in accordance with the difference therebetween.

3. An apparatus according to claim 2; in which said pilot signal recording means includes auxiliary signal transducing means repeatedly traversing the record medium in coordination with the first mentioned signal transducing means, and means for applying the pilot signal to be recorded to said auxiliary signal transducing means in a minor portion of selected traversals of the record medium by said auxiliary signal transducing means during said recording operation of the apparatus.

4. An apparatus according to claim 3; in which said auxiliary signal transducing means moves in advance of said first signal transducing means in repeatedly traversing the record medium; and further comprising means for applying an erasing signal to said auxiliary signal transducing means in the remainder of said traversals, of the record medium by said auxiliary signal transducing means during said recording operation of the apparatus.

5. An apparatus according to claim 3; further comprising erasing transducer means repeatedly traversing the record medium in advance of said auxiliary signal transducing means and said first signal transducing means, and means for applying an erasing signal to said erasing transducer means during said recording operation for erasing signals previously recorded on the record medium.

6. An apparatus according to claim 2; in which each of said areas having pilot signals recorded therein extends, at its opposite end portions, approximately halfway across the widths, considered in said direction of advancement of the record medium, of the first and last tracks of said respective plurality of said successive parallel tracks; and the reproduced pilot signals which are level compared are those derived from the signal transducing means as the latter traverses said opposite end portions, respectively, of each said area, so that said levels of the compared signals are substantially equal when said signal transducing means accurately scan said successive parallel tracks during said reproducing operation.

7. An apparatus according to claim 2; in which said means for applying information signals to said signal transducing means includes switching means by which the information signals are applied to said signal transducing means only during the traversal by the latter of a major portion of the record medium so that said successive parallel tracks in which the information signals are recorded are spaced, at least at one end, from a margin of the record medium; and in which said areas having the pilot signals recorded therein are located on an edge portion of the record medium between said one ends of the parallel tracks and said margin of the record medium.

8. An apparatus according to claim 7; in which said signal transducing means includes a plurality of substantially equally spaced apart rotary recording and reproducing heads movable in a circular path lying in a plane at said substantial angle to the direction of advancement of the record medium for traversing the latter in a cyclically repeating order, and said switching means applies the information signals to be recorded to said rotary recording and reproducing heads in said cyclically repeating order only during traversal of said major portion of the record medium by each of said recording and reproducing heads; and in which said pilot signal recording means includes an auxiliary rotary head movable in said circular path with said recording and reproducing heads so as to also repeatedly traverse the record medium, a source of pilot signals to be recorded, and means for applying said pilot signals to said auxiliary rotary head only as the latter moves across said edge portion of the record medium in selected traversals of the latter by said auxiliary rotary head.

9. An apparatus according to claim 8; in which said rotary recording and reproducing heads have predetermined gap widths for defining the widths of the respective parallel tracks in which the information signals are recorded, and said auxiliary rotary head has a gap width substantially greater than said gap widths of the rotary recording and reproducing heads for defining said extent of each of said areas in which said pilot signals are recorded.

10. An apparatus according to claim 9; in which said selected traversals of the record medium by said auxiliary rotary head during which said pilot signals are applied to said auxiliary rotary head, occur upon alternate revolutions of the auxiliary rotary head in said circular path.

11. An apparatus according to claim 10; further comprising means for applying an erasing signal to said auxiliary rotary head at all times when said pilot signal is absent therefrom during said recording operation; and in which said gap width of the auxiliary rotary head is substantially greater than the distance, in said direction of advancement of the record medium, covered by said plurality of recording and reproducing heads in one complete revolution thereof.

12. An apparatus according to claim 11; in which said gap width of the auxiliary rotary head is greater than the distance through which the record medium is advanced during each revolution of said auxiliary rotary head with said recording and reproducing heads so that, in each revolution which is intermediate said alternate revolutions, the application of said erasing signal to said auxiliary rotary head causes erasure of the pilot signal in the trailing end portion of the area in which said pilot signal was recorded during the next preceding revolution.

13. An apparatus according to claim 12; in which said gap width of the auxiliary rotary head and the axial positioning of the latter in respect to said recording and reproducing heads are selected so that, following said erasure of the trailing end portion, each said area in which the pilot signal is recorded extends, at its opposite end portions, approximately half-way across the widths, considered in said direction of advancement of the record medium, of the tracks in which information signals are recorded by one of said recording and reproducing heads in two successive revolutions of said one head; and in which said means for sampling and holding the levels of the reproduced pilot signals includes first and second sampling and holding circuits connected with said one recording and reproducing head for receiving the reproduced pilot signals from the latter, and means for effecting alternate operation of said first and second sampling and holding circuits in successive revolutions of said one head.

14. An apparatus according to claim 13; in which said means for sampling and holding the levels of the reproduced pilot signals further includes means receiving the reproduced pilot signals from another of said recording and reproducing heads and being operative, in response thereto, to establish the order of said alternate operation of the first and second sampling and holding circuits.

15. An apparatus according to claim 10; in which said pilot signals to be recorded have a frequency substantially lower than the frequency band of said information signals; and in which said means for deriving the reproduced pilot signals includes low pass filter means connected with said recording and reproducing heads for separating the reproduced pilot signals from the remainder of the output thereof.

16. An apparatus according to claim 10; in which there are two of said recording and reproducing heads, and said gap width of the auxiliary rotary head and the axial positioning of the latter in respect to said recording and reproducing heads are selected so that each said area in which the pilot signal is recorded extends, at its opposite and portions, approximately half-way across the widths, considered in said direction of advancement of the record medium, of the tracks in which information signals are recorded by said two recording and reproducing heads, respectively, in a respective revolution thereof; and in which said means for sampling and holding the levels of the reproduced pilot signals includes first and second sampling and holding circuits for receiving the reproduced pilot signals from said two recording and reproducing heads, respectively.

* * * * *